US005239133A

United States Patent [19]

Beck et al.

[11] Patent Number: 5,239,133

[45] Date of Patent: Aug. 24, 1993

[54] FITTING, ARRANGEMENT AND PROCESS FOR THE GUIDANCE AND FIXING OF ELECTRIC LINES

[75] Inventors: Erhard Beck, Weilburg; Albrecht Otto, Schoeneck-Buedesheim, both of Fed. Rep. of Germany

[73] Assignee: Alfred Teves GmbH, Frankfurt am Main, Fed. Rep. of Germany

[21] Appl. No.: 739,971

[22] Filed: Aug. 5, 1991

[30] Foreign Application Priority Data

Aug. 7, 1990 [DE] Fed. Rep. of Germany ....... 4024974

[51] Int. Cl.[5] ........................ H02G 3/18; F16M 11/00

[52] U.S. Cl. .............................. 174/65 R; 174/65 SS; 248/220.2

[58] Field of Search ......................... 174/65 R, 65 SS; 248/205, 921, 162; 403/243, 238; 277/178, 212 C, 237 A, DIG. 4

[56] References Cited

U.S. PATENT DOCUMENTS 4,901,395 2/1990 Semrau ................................ 248/56

FOREIGN PATENT DOCUMENTS 1924091 11/1970 Fed. Rep. of Germany .
3012738 10/1981 Fed. Rep. of Germany .
8807484 9/1988 Fed. Rep. of Germany .
3729550 3/1989 Fed. Rep. of Germany .
8900190 4/1989 Fed. Rep. of Germany .
8809922 10/1989 Fed. Rep. of Germany .
0516297 12/1939 United Kingdom .
0916461 1/1962 United Kingdom .
1232834 5/1971 United Kingdom .
1590536 6/1981 United Kingdom .
2115238 2/1983 United Kingdom .
2140114 1/1987 United Kingdom .

*Primary Examiner*—Harold Broome
*Attorney, Agent, or Firm*—Robert P. Seitter; J. Gordon Lewis

[57] ABSTRACT

A fitting arrangement and process for the guidance and the fixing of one or more electric lines passing into a cover lid, as far a valve block for electromagnetically switchable hydraulic valves. The lines are individually molded into a conductor accommodating element, which in turn is fit and sealed in an opening within the cover lid. The conductor accommodating element is retained in the cover lid opening by a protective cap having protrusions to lock the element in the opening, drawing a collar against the opposite side of the cover lid. The lines are bent over and exit an open end of the protective cap, which is locked in position by a ridge snapping into a depression in the cover lid as the cap is slid into grooves on the accommodating element.

19 Claims, 1 Drawing Sheet

FIG. 1
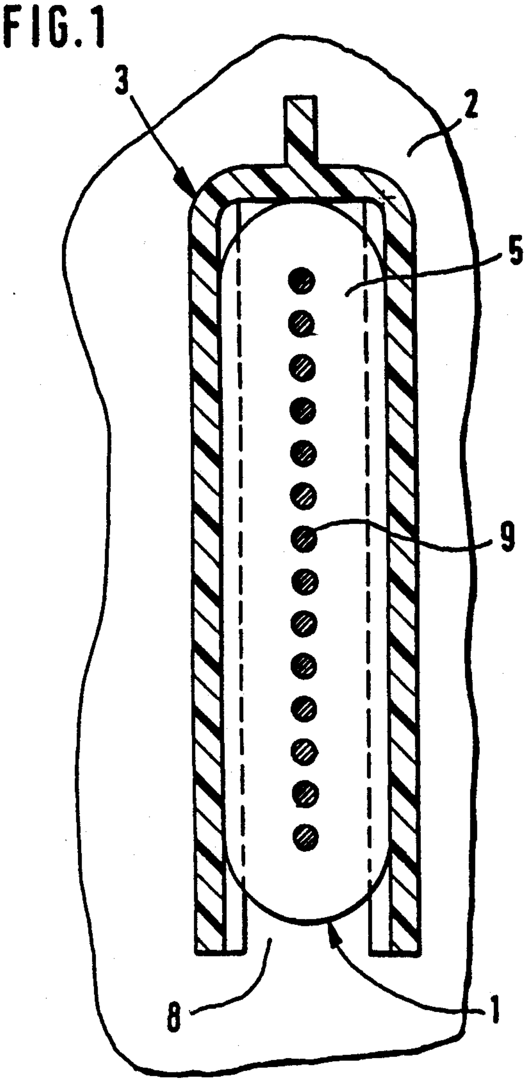
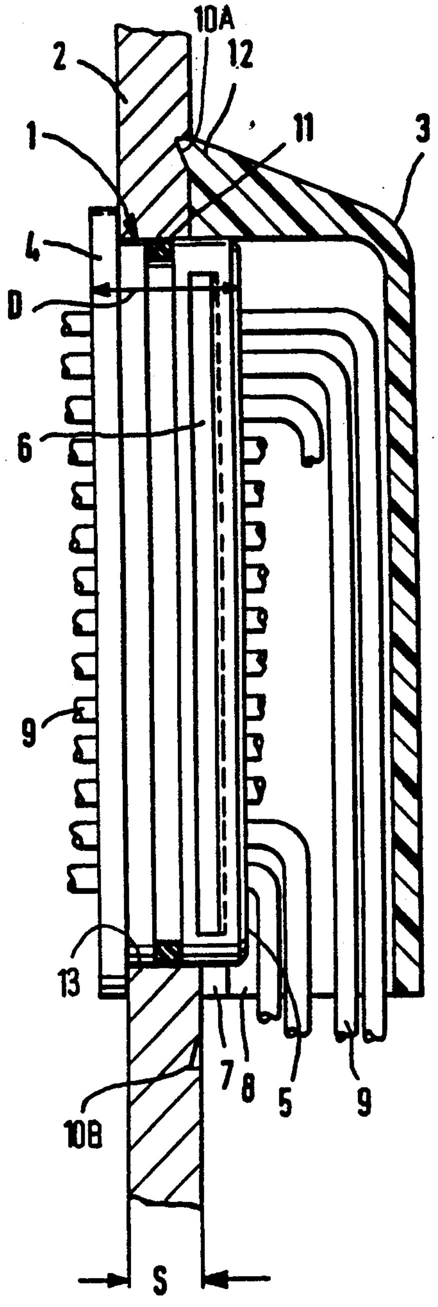
FIG. 2
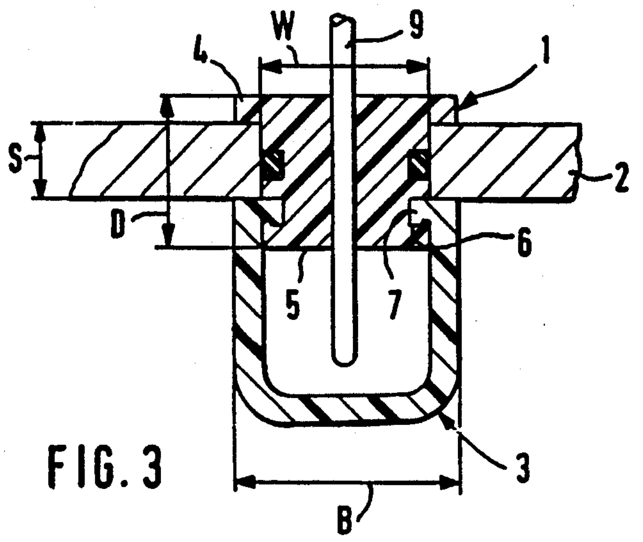
FIG. 3

FITTING, ARRANGEMENT AND PROCESS FOR THE GUIDANCE AND FIXING OF ELECTRIC LINES

This invention is related to a fitting for the guidance and the fixing of one or more of electric lines passing through a cover.

Electrohydraulic control systems are finding an increasingly widespread application. This is since there are many advantages in using an electrical circuit for the control of the system and an hydraulical circuit for the powering of the system. The interfaces between the electrical and hydraulic circuits comprise electromagnetically actuated hydraulic valves. These valves are grouped together so as to form assemblies (valve blocks). These assemblies have hydraulic supply and discharge lines and one or more electric lines for the transmission of the electrical control signals to switch the electromagnetic valves.

A fitting for the guidance and fixing of electric lines at a hydraulic assembly consisting of a base element and of a cover unit is already known from the German patent application published without examination, No. 3,729,550. The base element substantially consists of a valve block which is comprised of a plurality of electromagnetically actuatable hydraulic valves. The cover unit is in the shape of a cover lid furnished with a cable outlet. The cable outlet receives the electric lines of the solenoid valves. The cover lid consists of a body made of molded plastic material as is a hose-shaped element receiving the electric liner. The hose-shaped element and the body are closely coupled to each other by a plastics injection molding process and are safeguarded against external tensile strains between the base unit and the cover unit by means of pins passing through a flange of the cover and into the base unit.

In this arrangement moisture can penetrate into the interior space of the cover as the body accommodating the electric lines becomes loose due to a plastic or elastic deformation of the cover unit.

The invention has, therefore, the object to provide a fitting avoiding the described disadvantage of the state of the art while being adapted to automatic manufacturing processes and mounting methods. In particular, a fitting is provided for enabling electric lines to pass through while being retained in cover lids, as for valve blocks of electromagnetically switchable hydraulic valves, offering easy mounting. An essential aspect of the invention is that a watertight assembly is created.

It is, furthermore, part of the object of the invention to avoid the prior-art labyrinth seals in the passage of electric lines. In addition, the electric lines are sealed individually.

It is part of the object of the invention that any tensile strains which may affect the lines from the outside are not transmitted to the soldering points, i.e., to the points of contact with the coils of the electromagnetically actuatable valves.

SUMMARY OF THE INVENTION

The invention comprises a cable accommodating element through which the electric lines pass, each line individually molded to the accommodating element, which in turn is installed in an opening in the cover. There is provided a slide on locking of the cable accommodating element in its installed position, accomplished by a positive locking-type fixing means, preferably by assembly thereto of a protective cap, covering the electric lines at the point of exit through the cable accommodating element. This realizes a tension free as well as moisture-protected electric line passage through the cover, while making use of extremely simple mounting steps.

The cable accommodating element is formed with a collar or with local abutment surfaces which come to be abutted against the inside surface of the cover upon the installation of the conductor accommodating element into the cover opening, the cable accommodating element having a projecting prominence at the outside surface of the cover to be connectable to the protective cap in a positive locking engagement.

The positive locking engagement between the conductor accommodating element and the protective cap is accomplished by means of a groove mortised into the sides of the prominence, the groove extending at the level of the outside surface of the cover so that the conductor accommodating element is secured tightly to the cover.

The accommodating element has a perimeter seal sealing the element to the surfaces of the cover defining the cover opening.

The width of the protective cap is greater than the opening and the thickness is such that the cap tightly engages the other side of the cover adjacent the cover opening.

The protective cap is itself locked in position by engagement between features on the cap and cover other side such as a projection and depression snapped into engagement as the protective cap moves to a fully covering position over the accommodating element and cover opening. This prevents unintended detachment of the protective cap. .30 The protective cap defines an internal space sized to allow the electric lines to be bent over and exit through an opening at one side of the cap.

The cap is reversible so that the opening at one side can be located in the direction of runoff of splash water to protect the point of exit of lines from moisture.

The height of the space is such as to allow bending of the electric lines within a permissible bending angle for the electric lines.

DESCRIPTION OF THE DRAWINGS

FIG. 1 is a plan view of the fitting according to the present invention, showing the conductor accommodating element with the mounted protective cap in a longitudinal cross section;

FIG. 2 is a lateral longitudinal cross section through the fitting shown in FIG. 1; and FIG. 3 is a transverse cross section of the protective cap pushed onto the conductor accommodating element.

DETAILED DESCRIPTION

FIG. 1 shows a protective cap 3 having a fork-shaped longitudinal cross section with opposing features comprised of extensions 7, which engage a mating feature comprised of a groove 6 extending about the perimeter of substantially rectangularly-shaped electric line or cable accommodating element 1 of a suitable molded plastic or elastomer.

Each electric line 9 passes through from one side to the other of the accommodating element 1 and is individually molded thereto to be individually sealed to the element 1.

The protective cap 3 performs the function of a single-piece, positive locking-type fixing means by the mating of extension 7 and groove 6.

In this configuration, the exit opening 8 at one side of the protective cap 3 affords a parallel alignment of the exiting electric lines 9. Diametrically opposite the exit opening 8, a ridge 12 is positioned at the upper end of the protective cap 3, which in the illustrated mounting position, snaps into engagement with a depression 10A in the surface of the cover unit 2. The depression 10A is formed in the surface of the other side of the cover through which a prominence 5 of the accommodating element 1 protrudes when inserted from one side of the cover 2 through an opening 13 in the cover 2.

FIG. 2 shows a lateral longitudinal cross section through the protective cap 3 and the conductor accommodating element 1 which is fixed to the cover unit 2. A collar 4 of the conductor accommodating element 1 is abutted against the one side of the cover 2 adjacent the opening 13. A circumferential groove is formed in the conductor accommodating element 1, furnished with a sealing element 11 comprised of an O-ring extending about the opening 13 being configured as an oblong hole. The seal 11 prevents any penetration of moisture into the interior space of the cover unit 2.

The protective cap 3 has a rectangularly-shaped cross section and extends completely over the cover opening 13 and cable accommodating element 1 and the points of exit of the electric lines 9. An exit opening 8 is provided on one side of the protective cap 3, pointing downward in the mounting direction of the assembly in order to prevent any accumulation of splash water. On the top front side of the protective cap 3, opposite the exit opening 8, the ridge 12 is positioned which engages a depression 10A in the outer surface of the cover 2. An oppositely facing depression 10B allows reverse installation of the cap to insure drainage of splash water in a reversed situation.

FIG. 3 shows the cross sectional shape of the conductor accommodating element 1 and of the protective cap 3. The cross section of the conductor accommodating element 1 is substantially in the shape of a tee, positioned with a collar 4 against the inside surface of the cover unit 2, with the prominence 5 projecting beyond the outside surface of the cover 2 and in engagement with the protective cap 3 by means of the groove 6 mortised into the prominence 5.

The protective cap 3 has a substantially U-shaped cross section having inwardly facing extensions 7 pointing in the direction of the groove 6, which establish positive locking engagement between the conductor accommodating element 1 and the protective cap 3.

In order to enable tight fixing of the fitting to the cover 2, the smallest distance between the groove 6 and the collar 4 corresponds to maximum the wall thickness S of the cover 2. As a consequence, the extension 7 comes in abutment not only inside the groove 6 but also against the outside surface of the cover unit 2. For this purpose, the width B of the protective cap 3 in the range of said extension 7 has to be sized larger than the inside diameter W of the opening.

The protective cap 3 defines a low covered space above the accommodating element 1 sufficient to allow bending over of the electric lines 9 within permissible bending limits to be extended parallel to each other in being directed to the exit opening 8.

The electric lines 9 are either coated directly with the molding material individually in being molded to the conductor accommodating element 1 or are, else, indirectly coated after the fixing of separate molded components to the lines 9.

Assembly and disassembly of the fitting can be carried out in a comparatively easy manner by pushing in or pulling out the protective cap 3 into or off the groove 6 of the conductor accommodating element 1, as the case may be.

After removal of the protective cap 3, the electric lines 9, jointly with the conductor accommodating element 1, may be passed through opening 13 into the interior space of the assembly, to afford an easy mounting and also allow unimpeded access for soldering of the lines 9 to the solenoid valves or to a printed circuit board.

In a manner well compatible with the manufacturing technique, the lines 9 may be ready-made complete with the plug-in connectors and with the soldering pins.

Furthermore, by the engagement of the collar 4 against the inside surface of the cover unit 2, the tensile strain relief of the cables will be ensured. A particularly advantageous configuration of the molded component adding strain relief of the cables will be achieved if the section of the cables to be coated are assembled to an arrow-pointed rack, achieving an especially firm embedding of the lines in the conductor accommodating element by means of a positive locking engagement in addition to a frictional engagement.

We claim:

1. A fitting for the installation of one or more electric lines through an opening in a wall of a cover comprising:

- an electric line accommodating element having sad one or more electric lines passing through said accommodating element and individually molded thereto;
- said accommodating element having a portion configured to the shape of said cover opening and protruding though said cover wall from one side to the other of said cover wall, and a stop surface engaging said one side of said cover wall;
- said one or more electric lines extending through said opening being molded within said accommodating element; and
- a protective cap disposed over said accommodating element, said protective cap and accommodating element having complementary features thereon, said features interfit together upon sliding of said protective cap over said cover opening to lock to said accommodating element, said protective cap being larger than said opening to abut against said cover wall other side adjacent said opening.

2. The fitting according to claim 1 further including a seal inserted between the perimeter of said cover opening and said accommodating element.

3. The fitting according to claim 1 wherein said accommodating element is formed with a collar comprising said stop surface abutting against said one side of said cover wall adjacent said opening with said protective cap in engaging position therewith on the other side of said cover.

4. The fitting according to claim 1, wherein said protective cap is formed with an exit opening thereof through which said electric lines are directed.

5. The fitting according to claim 4 wherein said protective cap defines a covered space above said electric lines passing through said accommodating element, said covered space of sufficient height to enable bending over of said one or more electric lines and guiding the same to said exit opening.

6. The fitting according to claim 5 wherein said opening in said cover wall and said accommodating element are oblong in shape, and said accommodating element has a linear series of spaced apart electric lines extending along the length of said oblong shape, said electric lines each bent over to extend along the length of said accommodating element and directed out said exit opening in said protective cap.

7. A process of fixing and guiding a series of electric lines through an opening extending from one side to the other of a wall in a cover, said process comprising the steps of:

individually molding each electric line to pass within an accommodating element configured to pass through said cover opening with a portion passing from one side to the other of said cover wall to have a portion protruding through said opening, said electric lines extending from said one side of said cover wall to said other side of said cover wall through said opening and within said accommodating element;

fitting a protective cap to said protruding portion of said accommodating element so as to lock said accommodating element in position and cover said electric lines at the point of passing out from said accommodating element;

sealing said accommodating element to said cover wall around the perimeter of said opening and said accommodating element.

8. The process according to claim 7 further including the step of locking said protective cap to said cover wall other side in position over said electric wires.

9. The process according to claim 7 further including the step of bending said electric wires down over said cover wall other side and directing all of said wires parallel to each other to exit through an opening in the side of said protective cap.

10. An arrangement for the guidance and the fixing of one or more electric lines passing into an opening in a cover wall having a predetermined thickness, comprising a conductor accommodating element molded to each electrical line and disposed extending through said opening from one side of said cover wall to said other side, with a sealing engagement between the perimeter of said opening in said cover wall and the perimeter of said accommodating element, said conductor accommodating element stop surface abutting against one side of said wall cover, and retention features on a portion thereof protruding through said cover opening to be disposed on the other side of said cover wall at a predetermined distance from said stop surface;

a cap wider than said cover wall opening and engaging said features of said conductor accommodating element so as fix said accommodating element in said cover wall opening.

11. The arrangement as claimed in claim 10, wherein said conductor accommodating element has a thickness greater than said thickness of said cover wall in which said opening is formed.

12. The arrangement as claimed in claim 11, wherein a prominence is formed on said conductor accommodating element projecting beyond said other side of said cover wall, said prominence formed with said retention features, said features locked to said in a positive locking engagement.

13. The arrangement as claimed in claim 12, wherein said prominence is furnished with a retention groove extending along each of opposite sides thereof, said grooves comprising said retention features, said retention grooves engageable by said cap by means of a sliding motion, said distance between said retention grooves and said stop surface substantially equal to said wall thickness of said cover wall.

14. The arrangement as claimed in claim 10, wherein said cap extends over said opening and encloses said wires to comprise a protective cap, and said protective cap is formed with a lateral exit opening for said one or more electric lines.

15. The arrangement as claimed in claim 14, wherein said protective cap has an internal space above said accommodating element that is of a depth which is at least equal to the space required for the admissible bending angle of said one or more electric lines.

16. The arrangement as claimed in claim 10, wherein aid other side of said cover wall is formed with at least one locking feature, said locking feature engaged by a locking feature on said cap to be locked in position engaged with said accommodating element retention features.

17. The arrangement as claimed in claim 13, wherein said cap has U-shaped legs, an inwardly directed extension molded to each of said said U-shaped legs, said extensions respectively engaging one of said retention grooves.

18. The fitting as claimed in claim 17, wherein said extensions which engage said retention grooves abut both against said retention grooves and against said other side of said cover wall adjacent said cover opening.

19. The fitting as claimed in claim 10, wherein the said conductor accommodating element has a sealing element mounted extending about the perimeter hereof, and pressed against said cover about the perimeter of said opening.

* * * * *